United States Patent [19]

Deck

[11] Patent Number: 5,777,741
[45] Date of Patent: Jul. 7, 1998

[54] METHOD AND APPARATUS FOR OPTICAL INTERFEROMETRIC MEASUREMENTS WITH REDUCED SENSITIVITY TO VIBRATION

[75] Inventor: Leslie L. Deck, Middeltown, Conn.

[73] Assignee: Zygo Corporation, Middlefield, Conn.

[21] Appl. No.: 770,741

[22] Filed: Dec. 19, 1996

Related U.S. Application Data

[63] Continuation-in-part of Ser. No. 499,969, Jul. 10, 1995, Pat. No. 5,589,938.

[51] Int. Cl.$^6$ .................................................. G01B 9/02
[52] U.S. Cl. .............................................. 356/359; 356/345
[58] Field of Search ................................ 356/345, 359, 356/360

[56] References Cited

U.S. PATENT DOCUMENTS

| | | |
|---|---|---|
| 4,594,003 | 6/1986 | Sommargren . |
| 4,624,569 | 11/1986 | Kwon . |
| 4,653,921 | 3/1987 | Kwon . |
| 5,410,405 | 4/1995 | Schultz et al. . |

OTHER PUBLICATIONS de Groot, Peter J., "Vibration in phase–shifting interferometry", pp. 354–365, J.Opt.Soc.Am. A/vol. 12, No. 2 (Feb. 1995).

Farrell, C.T., et al., "Phase–step insensitive algorithms for phase–shifting interferometry", pp. 648–652, Meas. Sci. Technol. 5 (1994).

Greivenkamp, J.E., et al., "Phase Shifting Interferometry", pp. 501–598, Chapter 14, Optical Shop Testing, Second Edition (John Wiley & Sons, Inc., 1992).

Greivenkamp, J.E., "Generalized data reduction for heterodyne interferometry", pp. 350–352, Optical Engineering, vol. 23, No. 4 (Jul./Aug. 1984).

Kinnstaetter, K., et al., "Accuracy of phase shifting interferometry", pp. 5082–5089, Applied Optics, vol. 27, No. 24 (Dec. 15, 1988).

Kong, In–Bok, et al., "General algorithm of phase–shifting interferometry by iterative least–squares fitting", pp. 183–188, Optical Engineering, vol. 34, No. 1 (Jan. 1995).

Meiling, John A., "Interferometric Metrology of Surface Finish Below 1 Angstrom RMS", pp. 7–10, Tucson, Arizona, USA.

Schwider, J., et al., "Digital wave–front measuring interferometry: some systematic error sources", pp. 3421–3432, Applied Optics, vol. 22, No. 21 (Nov. 1983).

Seligson, J.L., et al., "Stability of a lateral–shearing heterodyne Twyman–Green interferometer", pp. 353–356, Optical Engineering, vol. 23, No. 4(Jul./Aug. 1984).

(List continued on next page.)

Primary Examiner—David C. Nelms
Assistant Examiner—Robert Kim
Attorney, Agent, or Firm—Bryan Cave LLP

[57] ABSTRACT

A method and system for providing interferometric measurements having reduced sensitivity to vibrations. An interference pattern from an interferometer (35) is amplitude split into first and second interferograms and imaged onto first and second detectors (10, 11), respectively, such as CCD cameras (10, 11). The two cameras (10, 11) have different data acquisition rates. The frame integration period of the slow detector is distinctly shorter than that of the fast detector. The detectors (10,11) are disposed such that the image fields substantially overlap and are synchronized with each other for enhancing vibration insensitivity. The shorter the integration period of the slow detector with respect to the fast detector, the greater the vibration insensitivity. During data acquisition a phase shifter (45) changes the phase difference between the beams in the interferometer (35) while data from both cameras (10, 11) is taken by a frame grabber (15) and saved in a computer (25). During data analysis, the phase at each image point on each frame of the fast data set is calculated by the computer (25), with the phase difference between interferograms in the slow data set being determined from the phases derived from the fast data set and with the slow data set then being analyzed for phase at each image point using the measured phase increments.

30 Claims, 7 Drawing Sheets

OTHER PUBLICATIONS

Smythe, R., et al., "*Precision Surface Metrology*", pp. 16–21, Proceedings of SPIE—The International Society for Optical Engineering, San Diego, California (Aug. 1983).

van Wingerden, Johannes, et al., "*Linear approximation for measurement errors in phase shifting interferometry*", pp. 2718–2729, Applied Optics, vol. 30, No. 19 (Jul. 1, 1991).

Wizinowich, Peter L., "*Phase shifting interferometry in the presence of vibration: a new algorithm and system*", pp. 3271–3279, Applied Optics, vol. 29, No. 22 (Aug. 1990).

METHOD AND APPARATUS FOR OPTICAL INTERFEROMETRIC MEASUREMENTS WITH REDUCED SENSITIVITY TO VIBRATION

CROSS-REFERENCE TO RELATED APPLICATIONS

This application is a continuation-in-part of my commonly owned, U.S. patent application entitled "Method and Apparatus for Optical Interferometric Measurements With Reduced Sensitivity to Vibration", bearing U.S. Ser. No. 08/499,969, filed Jul. 10, 1995, now U.S. Pat. No. 5,589,938 the contents of which are hereby specifically incorporated by reference in their entirety.

FIELD OF INVENTION

The present invention relates to an improved optical interferometric measurement method and apparatus with greatly reduced sensitivity to measurement errors produced not only by the presence of vibrations in the environment but also instrument phase shifting inaccuracies.

BACKGROUND OF THE INVENTION

An overview of interferometric techniques used in the prior art is provided by J. E. Greivenkamp and J. H. Bruning in Chapter 14 of "Optical Shop Testing", 2nd Ed., J. Wiley pub. edited by D. Malacara. These techniques are used extensively for high precision, non-contact metrology. With careful control of environmental conditions, measurement precision to the manometer scale or below is possible with these techniques; however, residual measurement errors may occur, with external vibration being the single largest cause of such residual measurement errors. For most commercial profilers, control of environmental conditions requires, at a minimum, a passively isolated instrument; however, passive vibration isolators perform poorly against low frequency vibrations. Prior art attempts at solving these problems have not been completely satisfactory with having involved such approaches as changing the phase extraction algorithm, as disclosed in articles by P. de Groot, "Vibration in phase shifting interferometry", J. Opt. Soc. Am. A 12 354–365 (1995), C. T. Farrell and M. A. Player, "Phase-step insensitive algorithms for phase-shifting interferometry", Meas. Sci. Tech. 5, 648–652 (1994), and I. Kong and S. Kim, "General algorithm of phase-shifting interferometry by iterative least-squares fitting", Opt. Eng. 34, 183–188 (1995). This prior art approach, while not completely satisfactory, can provide some useful reduction in vibration sensitivity. The prior art approaches suggested by Farrell and Player, and more recently Kong and Kim, show significant insensitivity to small amplitude vibrations if the phase shift is assumed to be constant across the field and a least squares fit to this constraint is performed in the analysis of the interferogram. Large amplitude vibrations, however, can make it impossible to overcome a phase ambiguity in the analysis that the authors attempt to currently resolve by assuming the phase shifts are unidirectional. Another prior art approach, which is not completely satisfactory as well, is discussed in an article by J. L. Seligson, C. A. Callari, J. E. Greivenkamp, and J. W. Ward entitled "Stability of a lateral-shearing heterodyne Twyman-Green interferometer", Opt. Eng. 23, 353–356 (1984) in which the authors discuss using a separate interferometer to measure the true phase shifts during interferogram acquisition. This, in principle, can substantially reduce vibration sensitivity even for large amplitude disturbances, but it is expensive and difficult to implement, requiring a stabilized laser, precision optics and sophisticated electronics to measure the true motion of the phase shifter. As a laboratory tool it may suffice, however, it is not a commercially viable solution. Another prior art approach, with results similar to those discussed in Seligson is disclosed in U.S. Pat. No. 5,410,405, to Schultz et al. which discloses using a homodyne interferometer to achieve similar motion measurements as Seligson above. Recent work on the vibration sensitivity of various algorithms, such as discussed in the above de Groot article, shows, however, that all algorithms will be most sensitive to vibrational frequencies at half the data acquisition rate since vibrations at this frequency produce phase variations which are indistinguishable from phase variations due to surface features. The sampling rates are driven by video with cameras most often being used to sample the interferogram, and that makes 30 Hz very typical; thus vibrations at 15 Hz and lower cause the bulk of the problems. Active vibration compensation devices, such as commercially available from Newport Corp. (Irvine Calif.) are expensive and can compensate for only a limited vibration amplitude range, and do not correct for deficiencies in the apparatus itself, such as scanning nonlinearities. Another prior art approach is discussed in a paper presented by J. A. Meiling, entitled "Interferometric Metrology of Surface Finish Below 1 Angstrom RMS", which appears in the April 1992 proceedings of the ASPE spring topical meeting on precision interferometric metrology. In this paper Meiling presented results based on massive data averaging. This methodology, however, is extremely slow and systematic errors will not average out.

Another prior art approach, called instantaneous phase detection, such as described by R. Smythe and R. Moore, in "Instantaneous phase measuring interferometry", Opt. Eng. 23, 361–364 (1984) and in U.S. Pat. Nos. 4,653,921 and 4,624,569 to Kwon, is fast, thereby "freezing out" the vibration effects, however, it requires a minimum of 3 detectors (typically four to achieve resolutions typically expected for an interferometric instrument) and these detectors must be prealigned spatially to sub-pixel accuracy and have the identical environmental characteristics if the operating conditions are not to be too restrictive. The image must be split between each detector and the phase shifted optically with a phase retarder, whose retardation must be either uniform across the field or known as a function of field. The individual pixel gains and offsets of each detector must be either identical (almost impossible) or mapped; and the images must also be acquired simultaneously, requiring the equivalent of 3 or 4 framegrabbers all synchronously operated. These problems and the associated costs make this prior art method extremely difficult to implement beyond single point detection applications described in the articles cited.

The practical difficulties of increasing the speed of data acquisition have even made even this apparent "straightforward" method relatively difficult, especially since profiling applications rarely wish to sacrifice lateral resolution for speed. High speed, high resolution sensors are rare and extremely expensive. For example, a 210 Hz, 1024 pixel× 1024 pixel, camera produced by the David Sarnoff Labs (the SAR 1024) has 32 parallel output taps and costs over $200,000. The high speed requirement directly impacts the camera signal to noise ratio, forcing most of these cameras into a multiple output (multitapped) configuration. The multitapped nature of these cameras then requires a sophisticated data acquisition device that is incompatible with typical commercial framegrabbers. A custom acquisition system for the SAR 1024 called the RAM CUBE was built by TRW and costs as much as the camera. Although, other commercially available high speed, high resolution cameras may be less costly, it has been found that incorporating high speed, high resolution cameras into practical commercially viable products at the present time, apart from any other problems, is simply not cost effective.

The present invention like that described in my copending U.S. patent application Ser. No. 08/499,963, overcomes these problems in the prior art and allows the use of inexpensive low frame rate, high density cameras to achieve vibration insensitivity almost as good as that achievable with a single camera of comparable density and speed. Furthermore, the presently preferred method of the present invention is applicable to many different types of interferometric systems, such as phase shifting interferometers, coherence scanning interferometers or long equivalent wavelength interferometers. In addition, the presently preferred method of the present invention is also capable of correcting for instrumental deficiencies, such as errors in the phase shifting apparatus, without the need for additional distance measuring interferometers, thereby reducing cost.

SUMMARY OF THE INVENTION

In accordance with the presently preferred method and apparatus of the present invention, the interference pattern, i.e. interferogram, generated by an interferometer is amplitude split to form two interferograms, one of which is imaged onto a first detector and the second of which is imaged onto a second detector. The two detectors preferably have different frame rates, i.e. data acquisition rates. Typically, preferably the fast frame rate detector has a low pixel density and, the slow frame rate detector has a high pixel density.

In accordance with the present invention, in a phase shift interferometric (PSI) type of measurement, such as is typically used for the topological profiling of surfaces, the high frame rate detector acquires a sequence of interferograms, referred to as the fast data set, during the data acquisition such that the phase separation between sequential interferograms is nominally 90 degrees. Whereas in my copending U.S. patent application Ser. No. 08/499,969 the frame integration tines of the slow and fast detectors are substantially identical, it has been found that enhanced vibration insensitivity is achieved when the frame integration period of the slow detector is distinctly shorter than the fast detector. Consequently, the low frame rate detector is preferably synchronized to the high frame rate detector so as to acquire a sequence, i.e. the slow data set, of interferograms with a reduced frame integration time relative to the fast detector, and at a lower frequency for enhancing the vibration insensitivity. The fast data set is then preferably analyzed for the phase for each interferogram using a conventional phase shift interferometry algorithm, and the phase difference between interferograms in the slow data set is determined from the phases derived from the fast data set. The slow data set is then preferably analyzed for the surface profile, with the phase differences obtained from the previous step above by a generalized phase shift interferometry algorithm which can account for non-equal phase separations between interferograms. In accordance with this presently preferred method, the phase separation between acquired interferograms may be dynamically measured which enables the correction of heretofore unknown phase errors due to instrument inaccuracies and the presence of external vibrations to be readily accomplished in a practical and commercially viable manner.

In a scanning, short coherence type of interferometric measurement, referred to as SWLI for Scanning White Light Interferometry, surface topology measurements also benefit from the ability of the present invention to dynamically measure the phase difference between interferograms. One SWLI method involves the dynamic computation of the contrast function and an immediate or subsequent search for the contrast peak. Using the dynamically measured phase difference method of the present invention in the contrast calculation, reduces errors in the computed contrast function due to instrument inaccuracies or external vibrations, thereby facilitating the peak determination. Another SWLI method involves interferogram capture and subsequent analysis in the frequency domain. By using the dynamically measured phase difference method of the present invention and performing, for example, a general Fourier transform on the interferogram data rather than a fast Fourier transform, the analysis can be made less susceptible to instrument inaccuracies and external vibrations.

DETAILED DESCRIPTION OF THE PREFERRED EMBODIMENT

Figure 1:
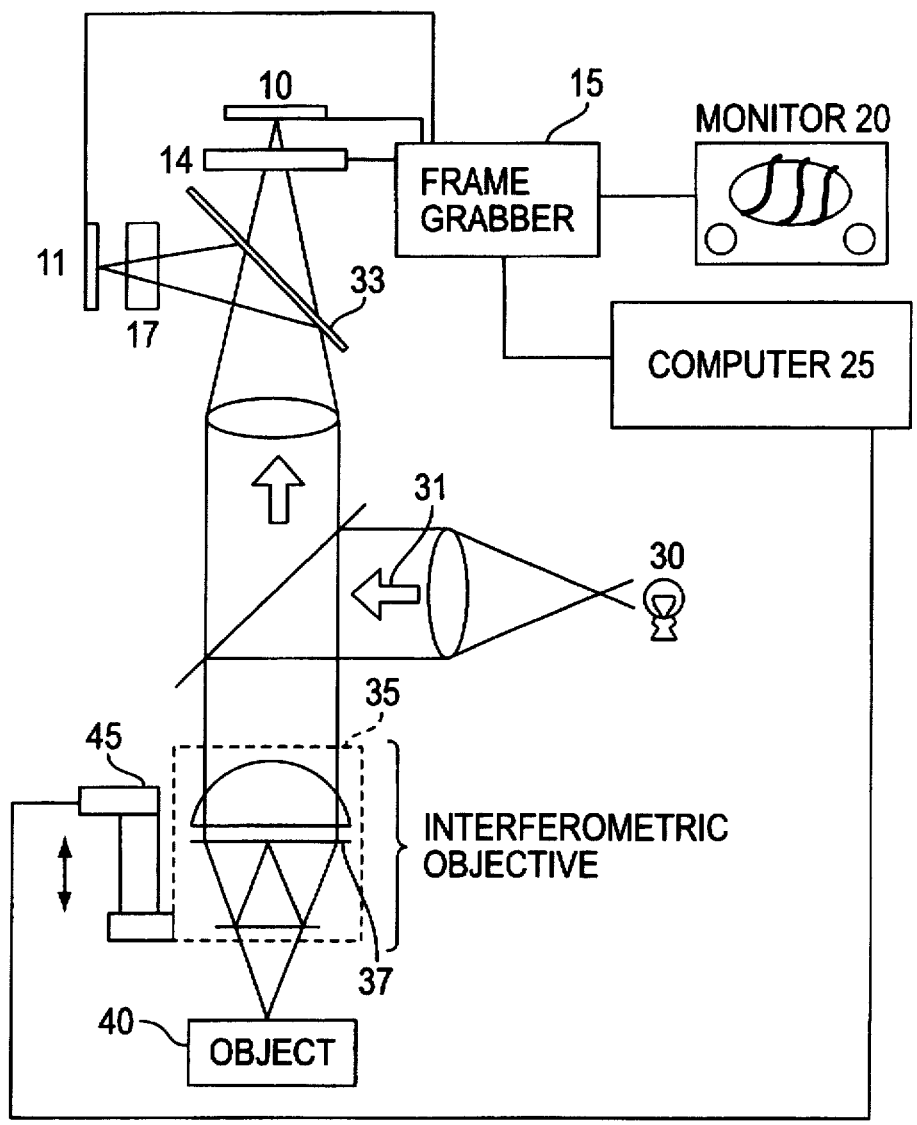
FIG. 1 is a schematic diagram of a small aperture configuration in accordance with the presently preferred method and apparatus of the present invention.

Returning now to the drawings in detail and initially to FIG. 1, the presently preferred apparatus for a small aperture configuration capable of carrying out the presently preferred method of the present invention is shown. In accordance with this preferred embodiment, a source of illumination 34 is provided for producing a beam of light 31 that enters a conventional interferometer, shown here for example as an interferometric objective 35, having a reference path and test path. A conventional phase shifting apparatus which may, by way of example, be an actuator such as a piezoelectric actuator 45, is preferably provided to vary the length of one of the interferometer paths by a controlled amount. The interferogram produced by the recombination of the beams from the two paths of the interferometer 35 is preferably amplitude split by a beam splitter 33 to form two interferograms one of which is preferably imaged onto a first detector 10 and the second of which is preferably imaged onto a second detector 11. The detectors which may preferably be cameras by way of example, could be, for example, charge coupled device (CCD) cameras. Preferably, in the above example, the two cameras have different frame rates, i.e.

data acquisition rates. Typically, the fast frame rate camera 11 preferably has a low pixel density and the slow frame rate camera 10 preferably has a high pixel density. Preferably, the cameras are so disposed such that the image fields substantially overlap and are synchronized with each other. The integration periods of the slow camera should be less than or equal to the integration period of the fast camera with enhanced vibration insensitivity being obtained by substantially reducing the frame integration time of the slow camera or detector to as short a time as possible. This can, for example, preferably be accomplished with an external shutter 14 in front of the slow camera 10. A narrow band filter 17 in front of the fast frame rate camera 11 may preferably be used primarily to increase the scan range for which high contrast interference is observed, although its inclusion is optional and depends on the illumination source 30 coherence properties.

Figure 2:
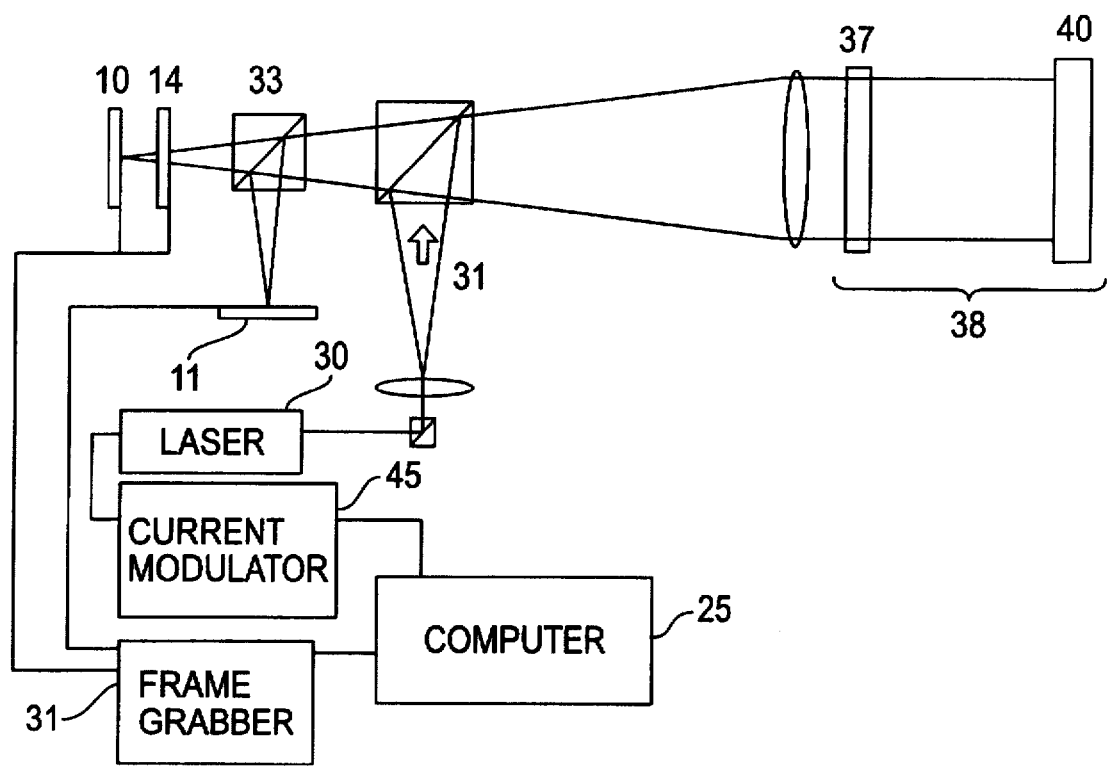
FIG. 2 is a schematic diagram, similar to FIG. 1, of a large aperture configuration in accordance with the presently preferred method and apparatus of the present invention.

Referring now to FIG. 2, a presently preferred apparatus in accordance with the present invention, for a large aperture configuration is shown. In accordance with this preferred embodiment, a source of illumination 30, shown here as a laser, most preferably a laser diode, is provided for producing a beam of light 31 that enters a conventional interferometer having an interference cavity 38 consisting of reference surface 37 and object 40. A conventional phase shifting apparatus is provided, which may be a piezoelectric actuator as was the case in the embodiment of FIG. 1, or preferably, for this configuration, it may be provided by modifying the laser diode pump current to vary the laser wavelength by a controlled amount as taught by commonly owned U.S. Pat. No. 4,594,003 to Sommargren. The interferogram produced by the recombination of the beams from the two paths of the interferometer is preferably amplitude split by a beam splitter 33 to form two interferograms one of which is preferably imaged onto a first camera 10 and the second of which is preferably imaged onto a second camera 11. The two cameras preferably have different frame rates, i.e. data acquisition rates. Typically, the fast frame rate camera 11 preferably has a low pixel density and the slow frame rate camera 10 preferably has a high pixel density. The cameras are preferably so disposed such that the image fields substantially overlap and are synchronized with each other. The integration periods of the slow camera should be less than or equal to the integration period of the fast camera. Enhanced vibration insensitivity can be obtained by substantially reducing the frame integration time of the slow camera or detector to as short a time as possible. This can, for example, preferably be accomplished with an external shutter 14 in front of the slow camera 10.

During data acquisition the phase shifter 45 preferably changes the phase difference between the beams in the interferometer in an approximately linear fashion while data from both cameras 10 and 11 is taken by a conventional framegrabber 15 and saved in a computer 25. The data from the fast frame rate camera 11 is called the fast data set and the data from the slow frame rate camera 10 is called the slow data set. The rate of phase change is preferably controlled such that nominally 90 degrees of phase change occurs between frames in the fast data set. Alternatively, preferably phase stepping could be implemented whereby nominally 90 degrees of phase change occurs between phase steps. Data acquisition preferably proceeds until a predetermined number of slow camera 10 frames are taken. The camera data acquisition rates are at least 2:1.

Figure 3:
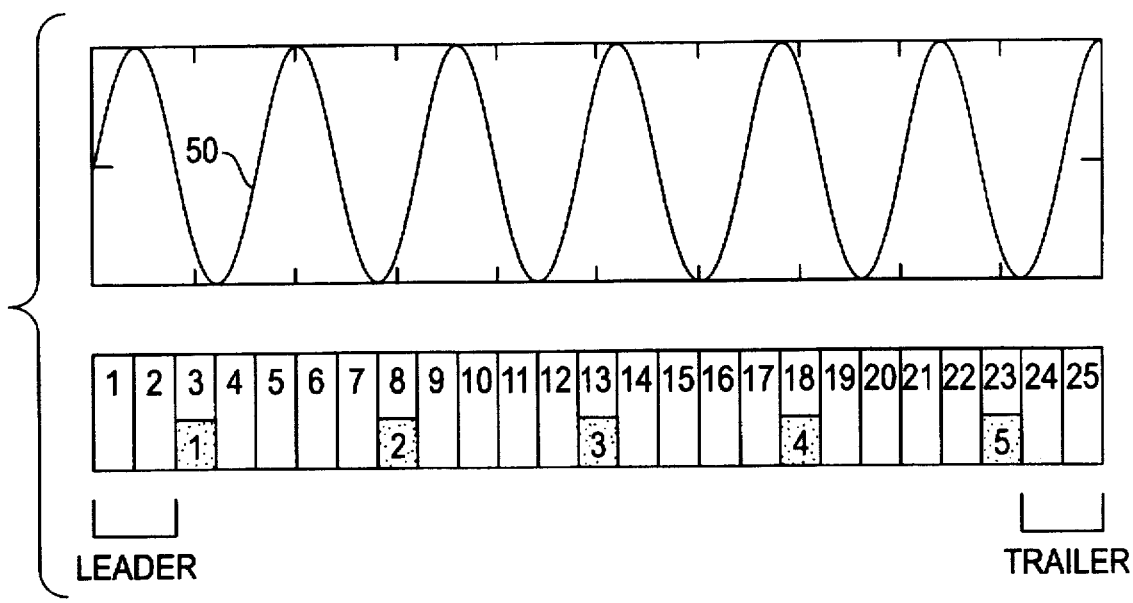
FIG. 3 is a typical illustrative frame acquisition timing diagram useful in explaining the presently preferred method of the present invention.

FIG. 3 illustrates a typical example of an acquisition where the fast camera 11 has a frame rate 5 times faster than the slow camera 10 and the slow data set consists of 5 equally spaced frames. The primary fringe pattern 50 is illustrated in FIG. 3 and is the top sinusoidal pattern. Fast camera 11 frame acquisitions in the example of FIG. 3 occur every 90 degrees of phase, identified by the boxes labeled 1 through 25. The slow camera 10 in the FIG. 3 example, only acquires data in the regions marked by the shaded boxes. Fast camera data is preferably required a few frames before the first slow camera frame (marked as leader frames) and after the last slow camera frame (trailer frames) to assure that the phases for those frames can be calculated with the chosen algorithm.

During data analysis, the phase at each image point on each frame of the fast data set is preferably calculated by the computer 25 using a conventional phase extraction algorithm, such as for example, the well known 5 point algorithm first introduced by Schwider et al. in "Digital wave-front measuring interferometry: some systematic error sources", Appl. Opt. 22, 3421–3432 (1983). These phases are then preferably unwrapped to remove $2\pi$ discontinuities inherent in the algorithm implementation, thereby providing a smoothly varying measurement of the phase variation produced by the phase shifter 45 plus environmental effects like vibrations as a function of field. The phase increment between each frame in the slow data set is preferably calculated using either the measured phase variation from the nearest neighbor field point in the fast data set, or some interpolation thereof. The slow data set is then preferably analyzed for phase at each image point with for example, a generalized least squares algorithm as described by Greivenkamp (J. E. Greivenkamp, "Generalized data reduction for heterodyne interferometry", Opt Eng. 23, 350–352 (1984)), using these measured phase increments. These phases are then preferably transformed into physical surface heights of the object 40 using the light beam 31 mean cwavelength.

Figure 4:
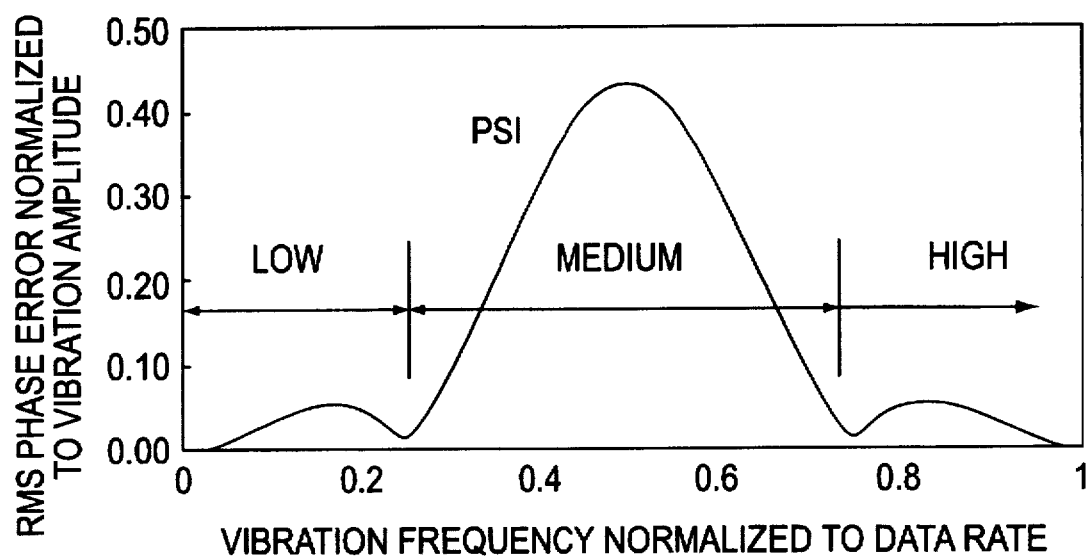
FIG. 4 is an illustrative graphical illustration of RMS phase errors vs vibrational frequency for standard Phase Shifting Interferometry useful in explaining the presently preferred method of the present invention.
Figure 5:
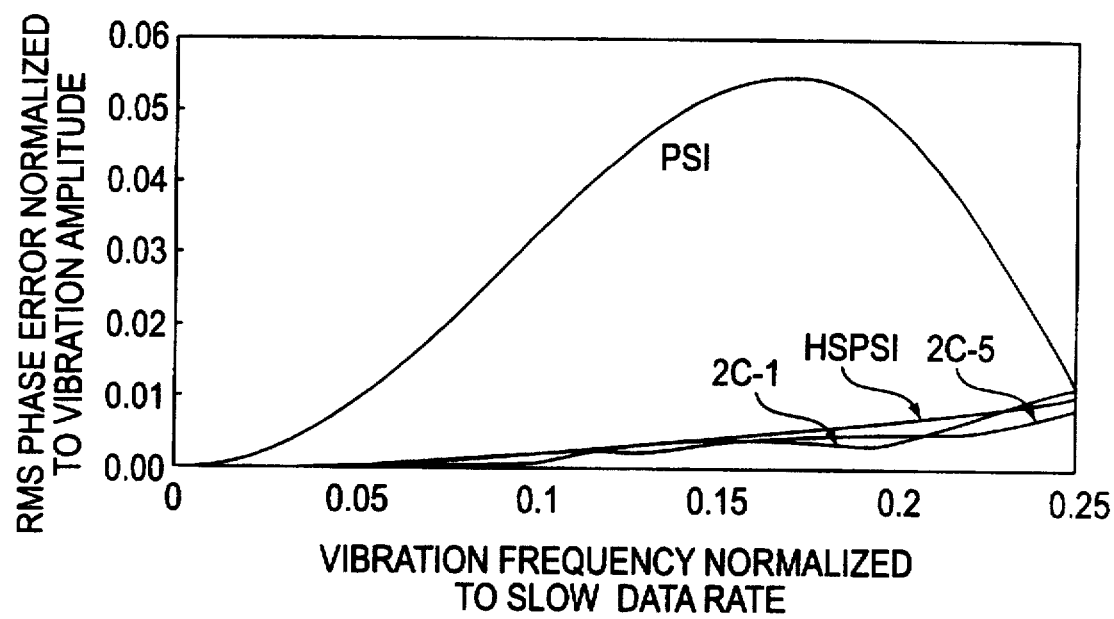
FIG. 5 is a graphical illustration, similar to FIG. 4, of RMS phase errors vs. vibrational frequency for low frequency vibrations.

FIG. 4 illustrates the RMS phase error normalized to the vibrational amplitude of pure sinusoidal vibrations as a function of the ratio of the vibration frequency to camera frame rate. In the example of FIG. 4, standard PSI analysis with the Schwider 5 point phase extraction algorithm was used, although for PSI a 3 point algorithm could also be used. The example of FIG. 4 provides a convenient way of categorizing vibrations into low, medium and high frequencies. Low frequency vibrations are defined as being inside the first PSI sensitivity peak, i.e. frequencies below 25% of the camera frame rate. Medium frequency vibrations are contained inside the main central peak (between 25% and 75% of the camera frame rate) and high frequencies are all frequencies above that. FIG. 4 illustrates a typical computer simulation of the vibration sensitivity of the preferably preferred method of the present invention and shows the reduction in sensitivity to low frequency vibrations when the method of the present invention is employed with a fast:slow camera ratio of 5:1. The results are compared in FIG. 5 with standard PSI acquired at a rate equal to the slow camera rate. In the example of FIG. 5, the Schwider 5 point phase extraction algorithm was used to determine both the fast data set phases and the standard PSI results. The curve labeled PSI in FIG. 5 represents the RMS error obtained using standard PSI while the curve labeled HSPSI (High Speed PSI) represents a standard phase shifting analysis on data acquired at the fast camera rate. Two other curves, 2C-5 and 2C-11, in FIG. 5 represent the RMS phase error using the method of the present invention, with the number after the dash representing the size of the slow data set used in the example of FIG. 5. As shown and preferred, the reduction in vibration sensitivity is substantial over the full range of low frequencies and is at least as good as acquiring at high speed.

Figure 6:
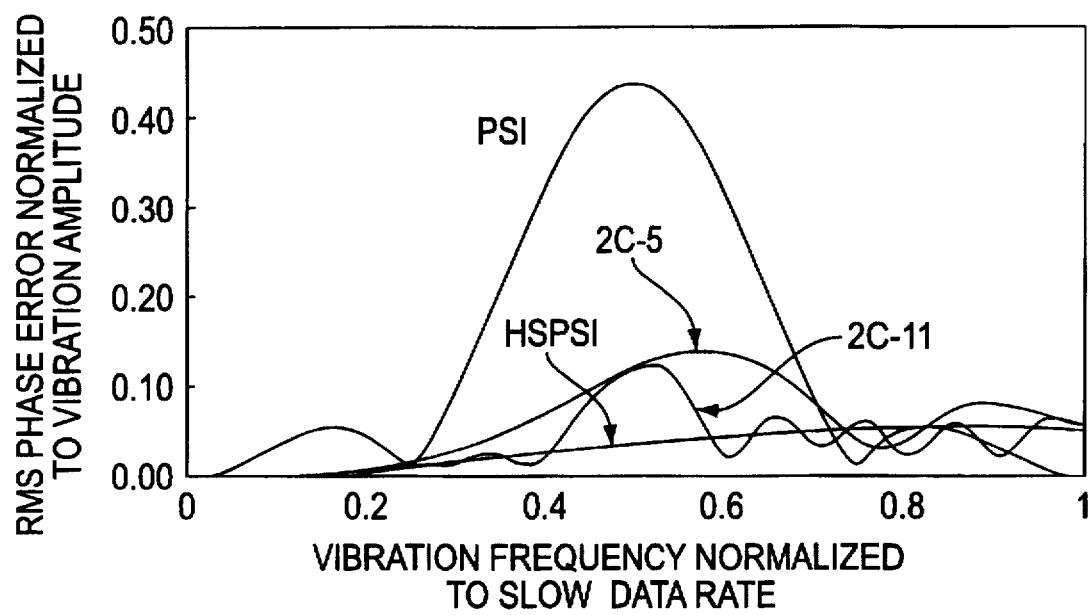
FIG. 6 is a graphical illustration, similar to FIG. 4, of RMS phase errors vs. vibrational frequency for medium frequency vibrations.
Figure 7:
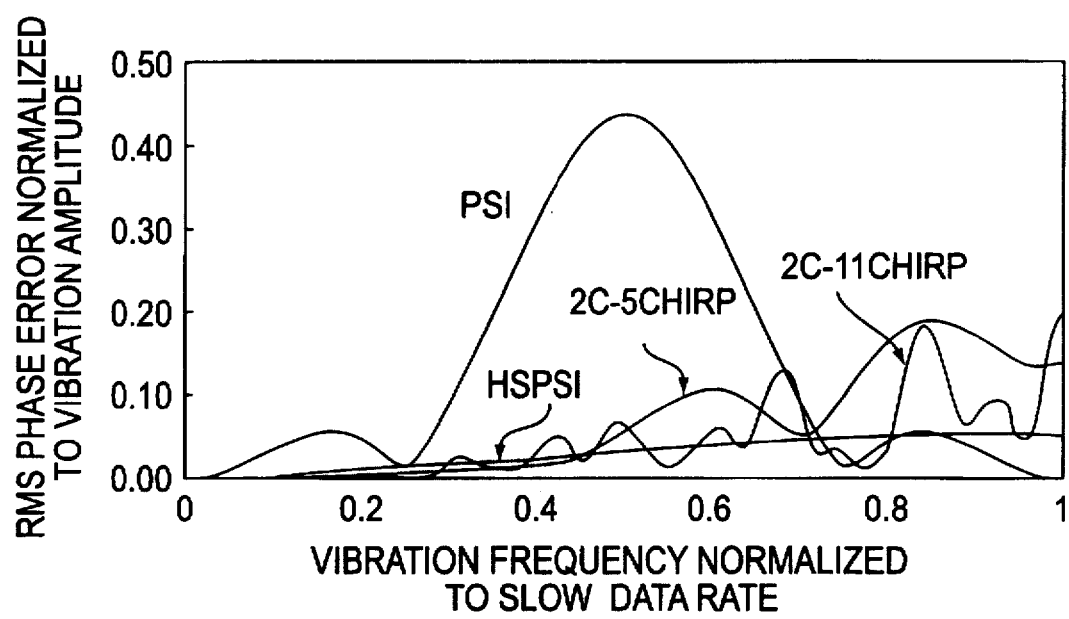
FIG. 7 is a graphical illustration, similar to FIG. 4 of RMS phase errors vs. vibrational frequency for medium frequency vibrations using chirped acquisition.

FIG. 6 illustrates an example of the improvement that the method of the present invention provides for medium vibrational frequencies. The improvement, though poorer than a high speed acquisition, is still substantially better than standard PSI at the slow acquisition rate. Higher frequencies are relatively easy to attenuate with passive isolators. Further sensitivity reduction at medium frequencies can be obtained at the cost of raising the high frequency sensitivity by chirping the acquisition. This is shown by way of illustration, in FIG. 7. To produce the curves 2C-5 Chirp and 2C-11 Chirp, illustrated in FIG. 7, the phase difference between adjacent slow data acquisitions was successively increased by 90 degrees. This ability to tailor the acquisition to provide the best vibration suppression for a particular environment is a further benefit of the present invention.

As previously noted, it has been found that a further reduction in the vibrational sensitivity, or an enhancement in vibration insensitivity over that provided in my copending U.S. patent application Ser. No. 08/499,969, can be provided by the improved method of the present invention by reducing the integration time of the slow camera compared with the fast camera. The residual sensitivity of the 2C-5 curve in FIG. 6 near a normalized vibrational frequency of 0.5 is due to intensity inaccuracies induced by averaging in the presence of vibration. Since the measured intensity obtained by integrating over a finite phase interval depends on the vibration amplitude and phase relative to the shifted interferometric phase, these intensity inaccuracies corrupt the phase calculation even if the mean phase separation between frames were exactly known. The reduction in vibration sensitivity may be realized by reducing the slow camera integration time by a factor of 2. This improvement may occur for chirped acquisitions as well. As the integration period of the slow camera is reduced, the photo-induced signal is proportionally reduced if the illumination intensity is constant. This signal to noise (S/N) reduction must be balanced against vibration concerns at the achievable intensities and usually determines the minimum slow camera integration period.

The maximum size of the slow data set depends on available memory in computer 25 and the maximum scan range of the phase shifter 45. Increasing the data set size generally has the effect of narrowing the sensitivity peaks, such as the one located at half the frame rate. This can be observed in FIG. 6.

The present invention improves upon prior art methods of providing vibration insensitivity for optical interferometric profilers by cost effectively measuring the effects of vibration on the interferometric phase at one or more points in the field. The phase separation between data points is a measured quantity rather than an assumed constant as is typically done in the prior art. In this manner the spectrum of vibrations that could effect the phase determination is shifted towards higher frequencies, which are more easily attenuated with passive isolators and have generally reduced amplitudes. The present invention provides this improvement for both large and small amplitude vibrations. In addition, the presently preferred method of the present invention automatically provides corrections for phase shifter nonlinearities as well. This has long been realized to be a major source of error in phase shifting measurements as was pointed out in a prior art article by J. van Wingerden, H. J. Frankena and C. Smorenburg, titled "Linear approximation for measurement errors in phase shifting interferometry", Appl. Opt. 30 2718–2729 (1991) and also by K. Kinnstaetter, A. W. Lohmann, J. Schwider and N. Streibl, in "Accuracy of phase shifting interferometry", Appl. Opt. 27, 5082–5089 (1988). The fact that the preferred method of the present invention is capable of utilizing the same interferometric apparatus used for the surface topology measurements provides a significant cost reduction relative to prior art methods. Commercial off-the-shelf cameras and frame grabbers can be used in the method of the present invention rather than specialized, and costly, detectors or framegrabbers. The presently preferred method also does not require in most applications, that the sampling density of the high speed camera 11 be very high because the phase variation due to vibrations is often common across the aperture. For microscopes, for example, by using the method of the present invention, the entire aperture can be corrected by measuring the phase variation at high rates from a single point in the aperture. The fast camera could, therefore, be replaced by a single photodiode. For large aperture interferometers measuring compliant objects, by using the method of the present invention, the aperture could be large enough to accommodate more than one spatial vibrational mode and the phase variations could then be a function of aperture. In these cases it is necessary to sample the aperture at a spatial density high compared to the highest expected spatial vibrational period. For most cases of interest only the low order vibrational modes are excited with any appreciable amplitude, so again the sampling density of the high speed camera 11 need not be very great.

Consequently, the presently preferred method and apparatus of the present invention overcomes many of the disadvantages of the prior art in providing a practical, and commercially viable solution to the problem of providing optical interferometric measurement having reduced sensitivity to measurement errors, such as provided not only by the presence of vibration sources in the environment, but by instrument phase shifting inaccuracies as well.

What is claimed is:

1. A method for providing interferometric measurements having reduced sensitivity to vibration comprising the steps of:

amplitude splitting an interference pattern into a first and a second interferogram;

imaging said first interferogram onto a first detector having a first data acquisition rate for acquiring a first data set of interferograms;

imaging said second interferogram onto a second detector having a second data acquisition rate for acquiring a second data set of interferograms, said second data acquisition rate being different than said first data acquisition rate, with said first data acquisition rate comprising a fast frame rate for providing a fast data set as said first data set and said second data acquisition rate comprising a slow frame rate for providing a slow data set as said second data set;

providing a distinctly shorter frame integration period for said second detector with respect to said first detector for enhancing vibration insensitivity;

analyzing said first data set for phase for said interferograms in said fast data set and analyzing said first data set for phase at each image point on each frame of said fast data set;

determining a phase difference between said interferograms in said slow data set from said phases derived from said fast data set; and analyzing said slow data set with said phase differences while accounting for nonequal phase separations between interferograms; wherein the phase separation between acquired interferograms may be dynamically measured while enabling correction of phase errors due to instrument inaccuracies and external vibrations calculating a phase increment between each frame in said slow data set using said fast data set phases and analyzing said slow data set for phase at each image point using said calculated phase increments.

2. An interferometric measurement method in accordance with claim 1 wherein said first detector has a low pixel density.

3. An interferometric measurement method in accordance with claim 2 wherein said second detector has a high pixel density.

4. An interferometric measurement method in accordance with claim 1 wherein said second detector has a high pixel density.

5. An interferometric measurement method in accordance with claim 1 further comprising the step of acquiring said fast data set such that the phase separation between sequential interferograms in said first data set of interferograms is nominally 90 degrees.

6. An interferometric measurement method in accordance with claim 5 wherein said slow data set analyzing step comprises the step of analyzing said slow data set for surface profile.

7. An interferometric measurement method in accordance with claim 1 wherein said slow data set analyzing step comprises the step of analyzing said slow data set for surface profile.

8. An interferometric measurement method in accordance with claim 5 wherein said first and second detectors comprise cameras.

9. An interferometric measurement method in accordance with claim 8 wherein said cameras comprise CCD cameras.

10. An interferometric measurement method in accordance with claim 1 wherein said first and second detectors comprise cameras.

11. An interferometric measurement method in accordance with claim 10 wherein said cameras comprise CCD cameras.

12. An interferometric measurement method in accordance with claim 10 wherein said cameras have associated image fields and said frame integration providing step comprises the step of disposing said cameras such that said image fields substantially overlap and are synchronized with each other.

13. An interferometric measurement method in accordance with claim 12 wherein said camera disposing step further comprises the step of providing an external shutter means in front of said slow camera.

14. An interferometric measurement method in accordance with claim 13 wherein said camera disposing step further comprises the step of providing a narrow band filter in front of said fast frame rate camera for increasing the scan range for which high contrast interference may be observed.

15. An interferometric measurement method in accordance with claim 1 wherein said fast frame rate is at least two times faster than said slow frame rate.

16. An interferometric measurement method in accordance with claim 15 wherein said slow data set comprises at least three frames.

17. An interferometric measurement method in accordance with claim 16 wherein said fast data frame acquisition occurs every 90 degrees of phase.

18. An interferometric measurement method in accordance with claim 1 wherein said frame integration period of said second detector is substantially reduced from said frame integration period of said first detector for enhancing vibration insensitivity; whereby, the shorter the integration period of said second detector with respect to said first detector, the greater said vibration insensitivity.

19. An interferometric measurement method in accordance with claim 1 wherein said frame integration period of said second detector is reduced by a factor of at least 2 from said frame integration period of said first detector for enhancing vibration insensitivity.

20. An interferometric measurement method in accordance with claim 1 wherein said phase increment calculating step comprises the step of using said measured phase variation from the nearest neighbor field point in said fast data set.

21. An interferometric measurement method in accordance with claim 1 wherein said phase increment calculating step comprises the step of interpolating the phase variation at each field point in the slow data set.

22. A system for providing interferometric measurements having reduced sensitivity to vibration comprising:

a source of illumination interferometer means comprising an interferometric objective having a reference path and a test path, said illumination source producing a light beam for entering said interferometer for providing a light beam along each of said paths which combine at the output of said interferometer means to produce an interferogram;

phase shifting means associated with said interferometer means for varying the length of one of said paths by a controlled amount;

beam splitter means disposed with respect to said interferometer means output for amplitude splitting said recombined interferogram into first and second imaging interferograms;

first and second detector means each having a different data acquisition rate, said first detector means having a fast frame rate for acquiring a fast data set of interferograms and said second detector means having a slow frame rate for acquiring a slow data set of interferograms, said beam splitter means imaging said first and second imaging interferograms onto said first and second detector means respectively, said first and second detector means comprising image fields and being disposed such that the frame integration period of said second detector means is distinctly shorter than the frame integration period for said first detector means;

said phase shifting means changing said phase difference between beams in said interferometer means during data acquisition; and means for analyzing said fast data set of interferograms for phase, determining a phase difference between said interferograms in said slow data set from said phases derived from said fast data set, and analyzing said slow data set with said phase differences while accounting for non-equal phase separations between interferograms; wherein the phase separation between acquired interferograms may be dynamically measured while enabling correction of phase errors due to instrument inaccuracies and external vibrations and means for calculating the phase at each image point on each frame of said fast data set during data analysis and calculating a phase increment for each image point of said fast data set phases.

23. An interferometric measurement system in accordance with claim 22 wherein said analyzing means comprises frame grabber means for taking data from said acquired frames from said detector means.

24. An interferometric measurement system in accordance with claim 23 wherein said first and second detector means comprise cameras.

25. An interferometric measurement system in accordance with claim 24 wherein said cameras comprise CCD cameras.

26. An interferometric measurement system in accordance with claim 25 wherein said analyzing means further comprises computer means having an associated memory means for saving the data taken by said frame grabber means.

27. An interferometric measurement system in accordance with claim 22 wherein said frame integration period of said second detector means is substantially reduced from said frame integration period of said first detector means for enhancing vibration insensitivity; whereby, the shorter the integration period of said second detector means with respect to said first detector means, the greater said vibration insensitivity.

28. An interferometric measurement system in accordance with claim 22 wherein said frame integration period of said second detector means is reduced by a factor of at least 2 from said frame integration period of said first detector means for enhancing vibration insensitivity.

29. An interferometric measurement system in accordance with claim 22 wherein said fast detector:slow detector means frame rate has a ratio of at least 2:1.

30. An interferometric measurement system in accordance with claim 29 wherein said first and second detector means comprise cameras, with said fast:slow camera ratio comprising at least 2:1.

\* \* \* \* \*